United States Patent
Fan et al.

(10) Patent No.: US 10,438,069 B2
(45) Date of Patent: Oct. 8, 2019

(54) METHOD AND APPARATUS FOR DETECTING ABNORMAL SITUATION, AND NON-TRANSITORY COMPUTER-READABLE RECORDING MEDIUM

(71) Applicants: Shengyin Fan, Beijing (CN); Zhongwei Cheng, Beijing (CN); Xin Wang, Beijing (CN); Qian Wang, Beijing (CN); Gang Qiao, Beijing (CN)

(72) Inventors: Shengyin Fan, Beijing (CN); Zhongwei Cheng, Beijing (CN); Xin Wang, Beijing (CN); Qian Wang, Beijing (CN); Gang Qiao, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 590 days.

(21) Appl. No.: 15/059,787

(22) Filed: Mar. 3, 2016

(65) Prior Publication Data
US 2016/0267328 A1  Sep. 15, 2016

(30) Foreign Application Priority Data
Mar. 9, 2015 (CN) .......................... 2015 1 0102360

(51) Int. Cl.
*G06K 9/46* (2006.01)
*G06K 9/62* (2006.01)
*G06K 9/00* (2006.01)

(52) U.S. Cl.
CPC ....... *G06K 9/00771* (2013.01); *G06K 9/4671* (2013.01); *G06K 9/6223* (2013.01); *G06K 2209/40* (2013.01)

(58) Field of Classification Search
CPC .................................................. G06K 9/00771
See application file for complete search history.

(56) References Cited

U.S. PATENT DOCUMENTS

| 7,003,136 | B1 * | 2/2006 | Harville ............. G06K 9/00201 348/169 |
| 8,610,760 | B2 * | 12/2013 | Tsai ........................ G06T 7/174 348/43 |
| 8,682,199 | B2 | 3/2014 | Toyoda et al. |
| 9,081,798 | B1 * | 7/2015 | Wong .................. G06F 16/5838 |
| 9,087,386 | B2 * | 7/2015 | Morris ............. G08B 13/19608 |

(Continued)

FOREIGN PATENT DOCUMENTS

| JP | 2007127478 A | 5/2007 |
| JP | 2012048690 A | 3/2012 |

(Continued)

OTHER PUBLICATIONS

Japanese Office Action dated Apr. 18, 2017.

*Primary Examiner* — Jayanti K Patel
*Assistant Examiner* — Irfan Habib
(74) *Attorney, Agent, or Firm* — Harness, Dickey & Pierce, P.L.C.

(57) ABSTRACT

A method and an apparatus for detecting an abnormal situation are disclosed. The method includes detecting whether a first target exists in an obtained image; recognizing whether the first target holds an object, when the first target exists in the image; obtaining motion information of the object, when the first target holds the object; and determining, based on the motion information of the object, whether the abnormal situation exists.

10 Claims, 5 Drawing Sheets

(56) References Cited

U.S. PATENT DOCUMENTS

| | | | | |
|---|---|---|---|---|
| 9,137,498 B1* | 9/2015 | L'Heureux | | H04N 7/18 |
| 9,489,743 B2* | 11/2016 | Spector | | G06T 7/60 |
| 9,595,108 B2* | 3/2017 | Horovitz | | A63F 13/65 |
| 9,636,588 B2* | 5/2017 | Horovitz | | A63F 13/06 |
| 9,886,634 B2* | 2/2018 | Sengupta | | G06K 9/00771 |
| 9,965,031 B2* | 5/2018 | Mantiuk | | G06F 3/013 |
| 10,025,989 B2* | 7/2018 | Drako | | G06K 9/00771 |
| 10,032,082 B2* | 7/2018 | Pang | | G06K 9/00389 |
| 10,102,732 B2* | 10/2018 | Gersten | | G08B 25/10 |
| 2004/0247176 A1* | 12/2004 | Aucsmith | | G06K 9/38 |
| | | | | 382/154 |
| 2005/0225443 A1* | 10/2005 | Lerg | | G08B 1/08 |
| | | | | 340/539.13 |
| 2006/0285723 A1* | 12/2006 | Morellas | | G06K 9/00369 |
| | | | | 382/103 |
| 2007/0085690 A1* | 4/2007 | Tran | | A61B 5/103 |
| | | | | 340/573.1 |
| 2007/0152837 A1* | 7/2007 | Bischoff | | G06F 19/3418 |
| | | | | 340/573.1 |
| 2008/0113317 A1* | 5/2008 | Kemp | | G06T 7/0012 |
| | | | | 433/215 |
| 2011/0026832 A1* | 2/2011 | LeMoigne-Stewart | | |
| | | | | G06K 9/4633 |
| | | | | 382/199 |
| 2012/0069151 A1* | 3/2012 | Tsai | | G06T 7/11 |
| | | | | 348/47 |
| 2012/0105267 A1* | 5/2012 | DeLia | | G01S 13/86 |
| | | | | 342/22 |
| 2012/0172681 A1* | 7/2012 | Sun | | A61B 5/067 |
| | | | | 600/301 |
| 2012/0229275 A1* | 9/2012 | Mattern | | G01S 5/18 |
| | | | | 340/540 |
| 2013/0287259 A1* | 10/2013 | Ishii | | H04N 5/232 |
| | | | | 382/103 |
| 2014/0064557 A1* | 3/2014 | Hara | | G06F 3/017 |
| | | | | 382/103 |
| 2014/0148733 A1* | 5/2014 | Stone | | A61B 5/004 |
| | | | | 600/595 |
| 2014/0361886 A1* | 12/2014 | Cowdry | | G08B 13/1672 |
| | | | | 340/522 |
| 2015/0080765 A1* | 3/2015 | Lampe | | A61B 5/112 |
| | | | | 600/595 |
| 2015/0194045 A1* | 7/2015 | Edwards | | G08B 13/1672 |
| | | | | 340/540 |
| 2015/0332463 A1* | 11/2015 | Galera | | G06K 9/00771 |
| | | | | 382/103 |
| 2015/0347079 A1* | 12/2015 | Price | | H04R 3/005 |
| | | | | 700/94 |
| 2017/0104915 A1* | 4/2017 | Adachi | | G06K 9/00369 |
| 2017/0347066 A1* | 11/2017 | Song | | G06T 7/70 |
| 2018/0276458 A1* | 9/2018 | Kawahara | | G06K 9/00771 |

FOREIGN PATENT DOCUMENTS

| | | |
|---|---|---|
| JP | 2012-083505 | 4/2012 |
| JP | 2012133665 A | 7/2012 |

* cited by examiner

METHOD AND APPARATUS FOR DETECTING ABNORMAL SITUATION, AND NON-TRANSITORY COMPUTER-READABLE RECORDING MEDIUM

BACKGROUND OF THE INVENTION

1. Field of the Invention

The present invention relates to methods and apparatuses for detecting an abnormal situation, and specifically, a method and an apparatus for detecting an abnormal situation based on whether a detected target holds an object.

2. Description of the Related Art

With the development of the technology and the improvement of the safety awareness of the people, a monitoring system is installed in more and more public places (such as public areas of stations, airports, banks, and office buildings). It is very important for establishment of an effective monitoring system to discover and recognize an abnormal situation existing in these public places. By recognizing an abnormal situation, a potential safety risk in a public place can be detected, and damage to the people and facilities can be avoided by taking a rapid response to the potential safety risk.

A method for determining an abnormal situation by recognizing an image and determining a risk of an object based on a shape of the object which appears in an image obtained by a camera of a monitoring system is provided. However, the determination result is easily influenced by factors such as change of a viewing angle, or an obstacle; thus, the ability of the method for distinguishing the risk is not enough, and it is often difficult to obtain a representative image of the object.

Moreover, a method for determining an abnormal situation by determining a risk of an object by infrared, tomography or microwave images using a detection apparatus other than a camera usually used in a monitoring system is provided. However, such a detection apparatus has a high cost, and cooperation of the people is usually necessary, and for example, it is often necessary for a person who holds an object to pass through a specified scanning apparatus; even though data obtained by the detection apparatus can stably indicate characteristic information of the object. As a result, it is usually difficult to realize such a method in public places.

SUMMARY OF THE INVENTION

In view of the above problems, the present invention has an object to provide a method and an apparatus that can determine a risk of an object.

According to an aspect of the present invention, a method for detecting an abnormal situation includes: detecting whether a first target exists in an obtained image; recognizing whether the first target holds an object, when the first target exists in the image; obtaining motion information of the object, when the first target holds the object; and determining, based on the motion information of the object, whether the abnormal situation exists.

According to another aspect of the present invention, an apparatus for detecting an abnormal situation includes: a target detecting unit configured to detect whether a first target exists in an obtained image; an object recognizing unit configured to recognize whether the first target holds an object, when the first target exists in the image; an object information obtaining unit configured to obtain motion information of the object, when the first target holds the object; and an abnormal situation determining unit configured to determine, based on the motion information of the object, whether the abnormal situation exists.

An abnormal situation occurring in a public place is usually caused by an object held by a person, such as a rod, a club, a knife, a gun or the like. According to the method and the apparatus for detecting the abnormal situation of embodiments of the present invention, it is recognized whether a target in an image holds an object, and it is determined whether the abnormal situation exists based on motion information of the held object when the target holds an object. Compared with the conventional method and apparatus for determining an abnormal situation by performing image recognition for an object, the method and the apparatus for detecting the abnormal situation according to the embodiments of the present invention can provide a more accurate and robust recognition result of the abnormal situation. Thus, the method and the apparatus for detecting the abnormal situation according to the embodiments of the present invention can be flexibly and effectively applied in an actual monitoring scene where a large number of variable objects with a risk may emerge.

DETAILED DESCRIPTION OF THE PREFERRED EMBODIMENTS

In the following, embodiments of the present invention are described in detail with reference to the accompanying drawings, so as to facilitate the understanding of the present invention. It should be noted that, in the specification and the drawings, the steps and the units that are essentially the same are represented by the same symbols and the overlapping description of these steps and units will be omitted.

The method and the apparatus for detecting an abnormal situation according to the embodiments of the present invention may be applied in a monitoring system with a camera. For example, the camera may be an ordinary camera with a single lens. As another example, the camera may also be, for example, a stereo camera such as a binocular camera. It should be noted that, specific forms of the stereo camera are not limited to this, and the camera may also be any camera that can obtain depth information of an object in an image. Additionally, in the embodiments of the present invention, the camera in the monitoring system may photograph a specific scene to be monitored, and an obtained image may be an image of the specific scene obtained by the camera.

Figure 1:
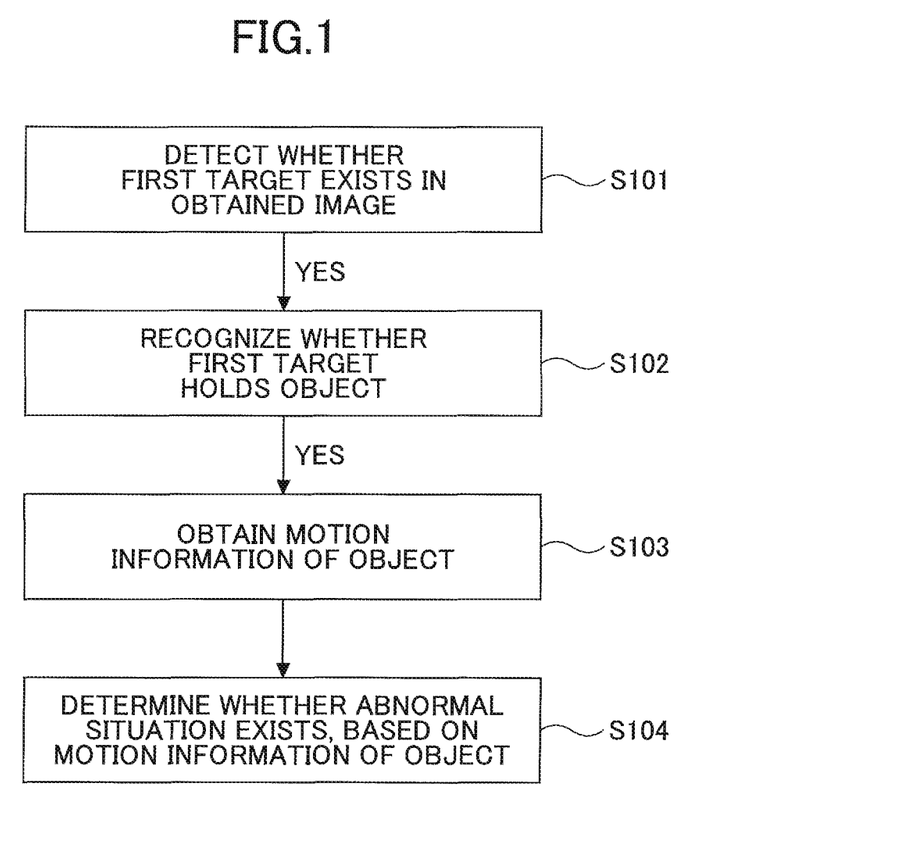
FIG. 1 is a flowchart illustrating an abnormal situation detecting method according to an embodiment of the present invention.

FIG. 1 is a flowchart illustrating an abnormal situation detecting method according to an embodiment of the present invention. In the following, the abnormal situation detecting method according to the embodiment of the present invention will be described with reference to FIG. 1. As shown in FIG. 1, in step S101, it is detected whether a first target exists in an obtained image. For example, the obtained image may include a visual intensity (color/grayscale) image and a depth image, the visual intensity image and the depth image may be data generated by a binocular camera, data generated by a trinocular camera, or data generated by a stereo camera based on TOF or an active light mode. The obtained image may be an image at a certain time, or a sequence of images in a certain period of time. Additionally, for example, the first target may be a person in the image.

Figure 2A:
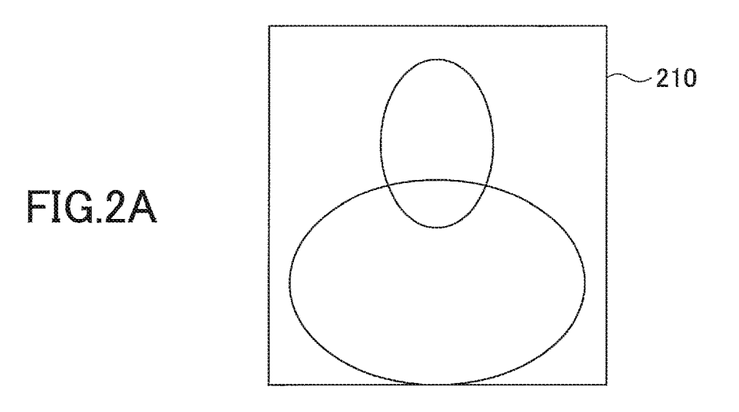
FIG. 2A is a schematic drawing illustrating a human body template according to the embodiment of the present invention.
Figure 2B:
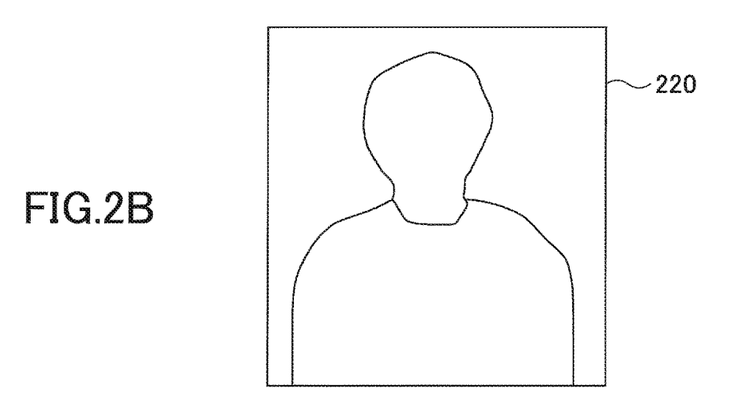
FIG. 2B is a schematic drawing illustrating a foreground image according to the embodiment of the present invention.
Figure 2C:
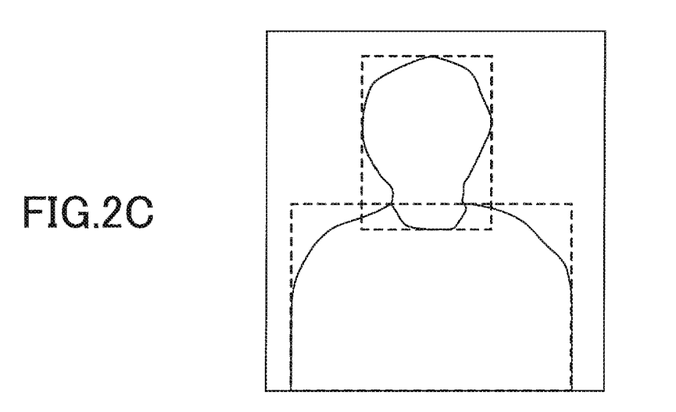
FIG. 2C is a schematic drawing illustrating determination of a human body region in the foreground image using the human body template according to the embodiment of the present invention.

When detecting whether the first target exists in the obtained image in step S101, first, a background model of the image may be generated using a conventional background modeling method, based on the obtained image (such as the visual intensity or the depth image). The background modeling may be static background modeling, and may also be dynamic background modeling constructed by using a Gaussian mixture model. And then, foreground pixels in the visual image and the depth image are extracted, respectively, using a background subtraction method. And then, a region where the first target is located is detected in a foreground image. In a case where the first target is a person, according to an example of the present invention, a human body region may be detected in a foreground image using a human body template. FIG. 2A is a schematic drawing illustrating a human body template 210 according to the embodiment of the present invention. As shown in FIG. 2A, the human body template 210 is a pre-trained human body template where a head and shoulders are normalized. FIG. 2B is a schematic drawing illustrating a foreground image 220 according to the embodiment of the present invention. FIG. 2C is a schematic drawing illustrating determination of a human body region in the foreground image 220 using the human body template 210 according to the embodiment of the present invention. As shown in FIG. 2C, matching between the human body template 210 and different regions of the foreground image 220 are performed, and it is determined whether a person exists in a foreground region based on a matching threshold.

In addition, according to another example of the present invention, in order to accurately detect whether the first target exists in the obtained image, when the obtained image is an image obtained by a stereo camera, a depth image corresponding to the obtained image may be generated, and the foreground image may be projected into a three-dimensional coordinate system using the depth image to generate a three-dimensional foreground point cloud. And then, a bird's-eye view of the foreground is obtained by calculation based on the three-dimensional foreground point cloud. For example, by using the three-dimensional foreground point cloud, pixels in the foreground image may be transformed from a camera coordinate system where the camera for obtaining the image is located to a world coordinate system. And then, in the unified world coordinate system, a three-dimensional space is divided by vertical intervals (bins). And then, statistics of numbers or maximum values of foreground pixels included in the vertical intervals are taken, so that statistical analysis is performed for the bird's-eye view to determine the human body region.

Referring back to FIG. 1, when the first target exists in the image, in step S102, it is recognized whether the first target holds an object. According to an example of the present invention, after the region where the first target is located is obtained in step S101, in step S102, a more accurate model may be established using visual representation information such as a histogram of gradient (HoG) or scale-invariant feature transform (SIFT) to recognize the target who holds the object.

In addition, preferably, when it is recognized that the first target holds the object in step S102, the region where the detected first target is located may be further divided to position a region where the held object is located. Specifically, an upper limb region of the first target may be determined using prior information of object structure and skin color; and then, search for an object region is performed around the upper limb region; and finally, morphological operation and smoothing is performed for the searched object region to perform complementation, so that the positioning for the region of the held object is completed.

If the held object is positioned, it may be determined that the scene corresponding to the obtained image is a scene with a target holding an object. And if the held object is not positioned, it may be determined that the scene corresponding to the obtained image is a scene without a target holding an object.

Figure 3:
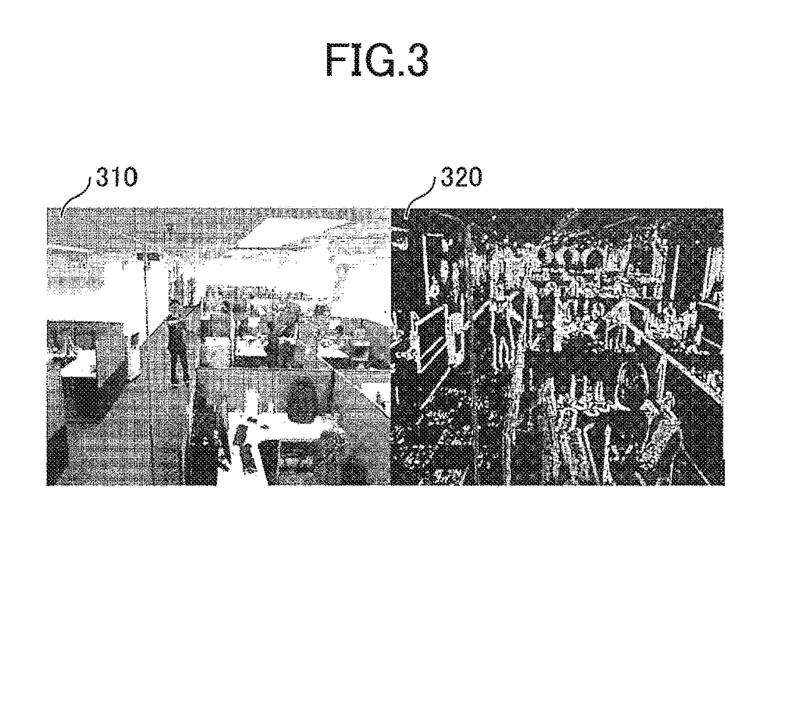
FIG. 3 is a schematic drawing illustrating a grayscale image and a depth image of an obtained image according to the embodiment of the present invention.
Figure 4:
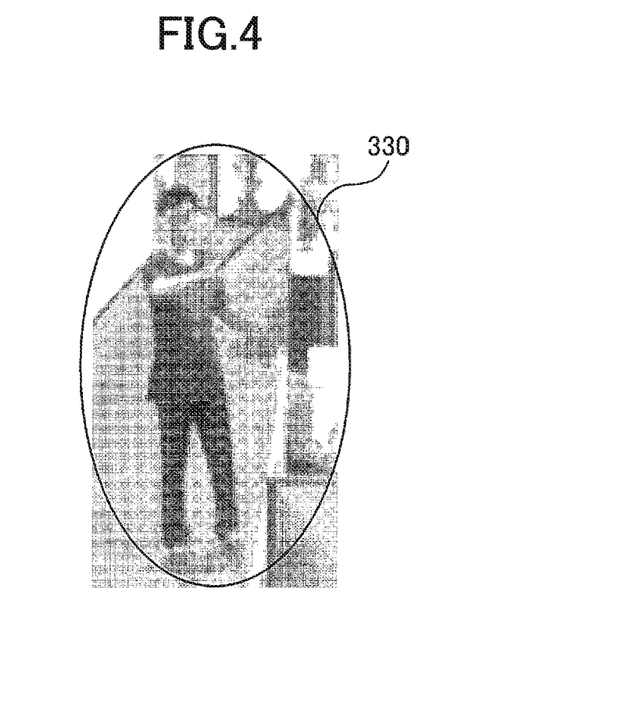
FIG. 4 is a schematic drawing illustrating a detected first target which holds an object according to the embodiment of the present invention.

FIG. 3 is a schematic drawing illustrating a grayscale image 310 and a depth image 320 of the obtained image according to the embodiment of the present invention. As shown in FIG. 3, in the grayscale image 310 and the depth image 320, a person who holds a short rod in hand stands in an office. FIG. 4 is a schematic drawing illustrating a detected first target which holds an object according to the embodiment of the present invention. As shown in FIG. 4, the person with the held object 330 can be accurately separated from the grayscale image 310 by step S101 and step S102.

Referring back to FIG. 1, when the first target holds the object, in step S103, motion information of the object is obtained. According to an example of the present invention, the motion information of the object may include at least one of a movement speed of the object, a motion direction of the object, and a method for using the object by the first target. As another example, the method for using the object by the first target may be waving, cutting, throwing and the like. Additionally, the motion information such as the movement speed, the motion direction and the method for using the object may be calculated, according to object history motion information obtained based on the previously obtained images and object current motion information obtained based on the currently obtained image. And then, in step S104, it is determined whether the abnormal situation exists, based on the motion information of the object.

For example, in step S103, a motion energy image (MEI) and a motion history image (MHI) of the object held by the target may be established based on the object history motion information and the object current motion information.

Specifically, the MEI describes a motion shape and spatial distribution of motion of the object, and amplitude of each pixel in the MHI represents a function of motion intensity at the position of the pixel. One of the benefits of the MHI representing the motion of the object is that motion of a plurality of images within a time range is encoded and displayed in one frame of image. The MEI and the MHI may be regarded as two components of a time domain template of the object motion, and all of the components of pixel of the time domain template are a function of the motion of the position pixel. A motion mode of the object can be determined and the method for using the object by the first target can be further determined, by performing matching between the time domain templates of the motion relating to these visual angles and templates of known motion types.

Figure 5:
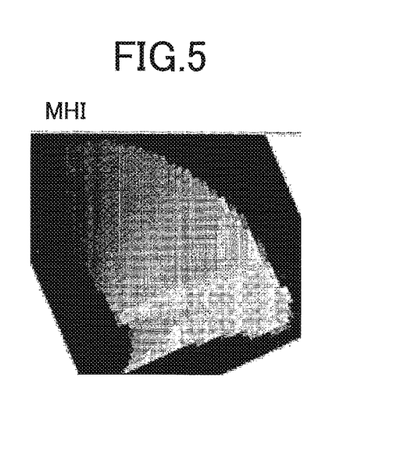
FIG. 5 is a schematic drawing illustrating an MHI of the object held by the first target according to the embodiment of the present invention.

FIG. 5 is a schematic drawing illustrating an MHI of the object held by the first target according to the embodiment of the present invention. Intensity amplitude of each pixel in FIG. 5 represents motion history at the position of the pixel, and a brighter pixel represents movement closer to a current time in a time domain. In the example shown in FIG. 5, the object held by the first target is a short rod and the first target waves the rod.

In order to reduce the influence of viewing angle and reliably determine the motion information of the object held by the target, preferably, in step S103, two-dimensional motion information of the object held by the target may be obtained based on a sequence of images obtained in a period; a depth image of the obtained image may be generated; and the two-dimensional motion information of the object may be projected into a three-dimensional space using the depth image to generate three-dimensional motion information of the object. In step S104, it may be determined whether the abnormal situation exists, based on the three-dimensional motion information of the object.

For example, after a two-dimensional MHI is obtained, the two-dimensional MHI may be projected into a three-dimensional space using the depth image of the obtained image to obtain a three-dimensional MHI. Representation of object motion and recognition of motion mode may be performed using the three-dimensional MHI. At the same time, a speed and a direction of movement of the object in the three-dimensional space may be accurately calculated based on the three-dimensional MHI.

Furthermore, according to an example of the present invention, a risk of the object held by the first target Risk(object) may be calculated according to the following formula (1).

$$\text{Risk(object)}=F1(\text{Mode(object)},\text{speed},\text{direction}) \quad (1)$$

Where Mode(object) represents the mode for using the object by the first target, speed represents a movement speed of the object, and direction represents a movement direction of the object. Additionally, F1 may be a simple linear function, and may also be a nonlinear function, based on different determination standards.

Then, it may be determined whether the abnormal situation exists based on the calculated risk of the object. For example, abnormality coefficients of different motion modes may be defined based on needs of an actual situation, and for example, stabbing, cutting and chopping may have a high abnormality coefficient, and waving may have a low abnormality coefficient. Furthermore, the faster the speed is, the higher the abnormality coefficient is. In addition, it may be determined that the object has a high abnormality coefficient, if the movement direction of the object is a direction moving away from a person who holds the object. As another example, it may be defined that the abnormality coefficient of a downward movement is smaller than the abnormality coefficient of a upward movement, and the abnormality coefficients of a downward movement and a upward movement are smaller than the abnormality coefficient a direct outward movement. The higher the abnormality coefficient is, the greater the appearance probability of the abnormal situation is.

Additionally, according to another example of the present invention, it may also be determined whether the abnormal situation exists in the scene based on the first target who holds the object in the obtained image, and correlation between the first target and another target. Specifically, the method shown in FIG. 1 may further include: obtaining motion information of the first target, when the first target holds the object; and determining whether the abnormal situation exists based on the motion information of the first target.

In order to accurately obtained motion information of the target in the obtained image and the object held by the target, according to an example of the present invention, a depth image of the obtained image may be generated; the first target and the object may be projected into a three-dimensional space using the depth image to obtain three-dimensional motion information of the first target and the object in the three-dimensional space; and the three-dimensional motion information of the first target and the object may be projected into a bird's-eye view to obtain bird's-eye motion information of the first target and the object. Accordingly, it may be determined whether the abnormal situation exists, based on the bird's-eye motion information of the object and the first target.

For example, the first targets (such as the persons) of all of the detected objects may be calculated based optical flow, and the optical flow of all pixels on the each of the persons may be calculated for a sequence of color/grayscale images. Then, a depth image corresponding to the obtained image may be generated, and the person may be projected into a three-dimensional space using the depth image to obtain a three-dimensional point cloud of the person. A direction and a speed of movement of each of optical flow points of the person in the three-dimensional space can be obtained, based on results of the optical calculation and matching. And then, the three-dimensional point clouds of the persons are projected into a bird's-eye view to obtain bird's-eye speed distribution and bird's-eye direction distribution of the movement of the persons. Furthermore, bird's-eye speed distribution and bird's-eye direction distribution of the movement of the objects held by the persons may be obtained by a similar method.

Furthermore, preferably, the method shown in FIG. 1 may further include: determining, in the obtained image, whether the first target moves toward a second target, based on the motion information of the first target; and determining whether the abnormal situation exists, based on a distance between the first target and the second target, when the first target moves toward the second target. According to an example of the present invention, a risk of behavior of the first target Risk(harmful_action) may be calculated according to the following formula (2), based on the direction and speed of the movement of the first target, the direction and speed of the movement of the held object, and a distance between the first target and the second target.

$$\text{Risk(harmful\_action)}=F2(\text{dis},P\_\text{speed},P\_\text{direction},\\ O\_\text{speed},O\_\text{direction}) \quad (2)$$

Where dis represents the distance between the first target and the second target, P_speed represents the speed of the movement of the first target, the P_direction represents the direction of the movement of the first target, O_speed represents the speed of the movement of the held object, and the O_direction represents the direction of the movement of the held object. Additionally, F2 may be a simple linear function, and may also be a nonlinear function, based on different determination standards. And then, it may be determined whether the abnormal situation exists, based on the calculated risk of the behavior of the first target. The directions and the speeds of the movements of the first target and the held object in the formula (2) may be directions and speeds of movement in the bird's-eye view, and may also be directions and speeds of movement calculated by other methods, such as directions and speeds of movement in a three-dimensional space.

Abnormality coefficients of different motion modes may be defined based on needs of an actual situation. For example, the smaller dis is, the greater the abnormality coefficient is; the greater the speed of the first target P_speed is, the greater the abnormality coefficient is; the more the direction of the movement of the first target P_direction orients toward the second target, the greater the abnormality coefficient is; the greater the speed of the held object O_speed is, the greater the abnormality coefficient is; and the more the direction of the movement of the held object O_direction orients toward the second target, the greater the abnormality coefficient is. The greater the abnormality coefficient is, the greater the appearance probability of the abnormal situation is.

According to the method for detecting the abnormal situation of embodiments of the present invention, it is recognized whether a target in an image holds an object, and it is determined whether the abnormal situation exists based on motion information of the held object when the target holds an object. Compared with the conventional method and apparatus for determining an abnormal situation by performing image recognition for an object, the method and the apparatus for detecting the abnormal situation according to the embodiments of the present invention can provide a more accurate and robust recognition result of the abnormal situation. Thus, the method and the apparatus for detecting the abnormal situation according to the embodiments of the present invention can be flexibly and effectively applied in an actual monitoring scene where a large number of variable objects with a risk may emerge.

According to another example of the present invention, the method shown in FIG. 1 may include determining whether the abnormal situation exists, based on both the risk of the object held by the first target calculated by the formula (1) and the risk of the behavior of the first target calculated by the formula (2).

Furthermore, preferably, the method shown in FIG. 1 may further include: performing image recognition for the object held by the first target to determine attributes of the object; and determining whether the abnormal situation exists based on the determined attributes of the object.

Additionally, when it is recognized that the first target does not hold an object in step S102, the method shown in FIG. 1 may further include: determining whether the abnormal situation exists, based on the motion information of the first target and a result of image recognition of the first target.

Figure 6:
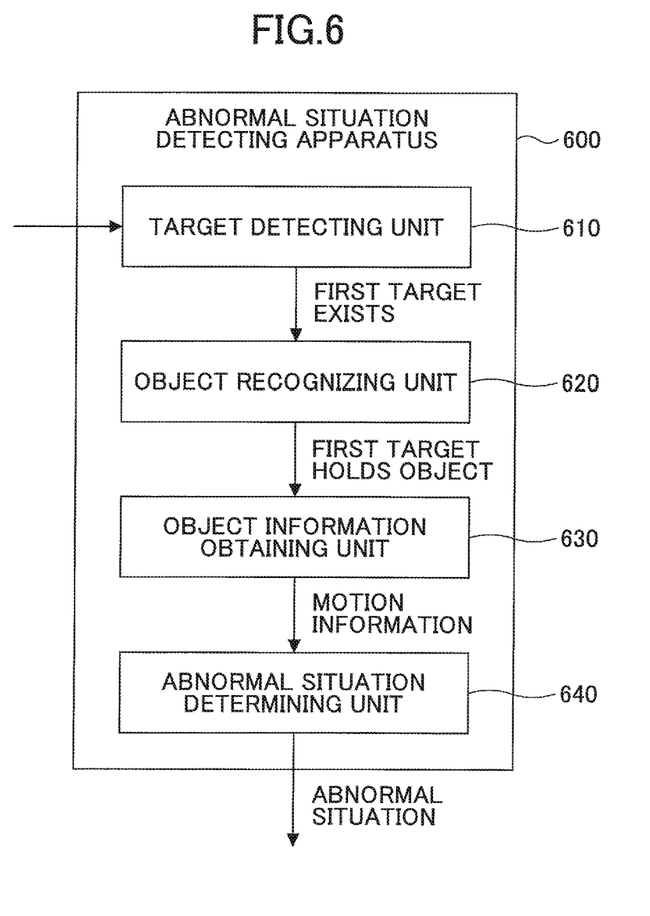
FIG. 6 is a structure block diagram illustrating an abnormal situation detecting apparatus according to another embodiment of the present invention.

In the following, an abnormal situation detecting apparatus according to another embodiment of the present invention will be described with reference to FIG. 6. FIG. 6 is a structure block diagram illustrating an abnormal situation detecting apparatus 600 according to another embodiment of the present invention. As shown in FIG. 6, the abnormal situation detecting apparatus 600 of the embodiment includes a target detecting unit 610, an object recognizing unit 620, an object information obtaining unit 630, and an abnormal situation determining unit 640. The units of the abnormal situation detecting apparatus 600 may execute steps/functions of the abnormal situation detecting method in FIG. 1, respectively. Accordingly, in the following, only main units of the abnormal situation detecting apparatus 600 will be described, and the detailed contents that have been described with reference to FIG. 1 will be omitted.

The target detecting unit 610 detects whether a first target exists in an obtained image. For example, the obtained image may include a visual intensity (color/grayscale) image and a depth image, the visual intensity image and the depth image may be data generated by a binocular camera, data generated by a trinocular camera, or data generated by stereo camera based on TOF or an active light mode. The obtained image may be an image at a certain time, or a sequence of images in a certain period of time. Additionally, for example, the first target may be a person in the image.

When the target detecting unit 610 detects whether the first target exists in the obtained image, first, a background model of the image may be generated using a conventional background modeling method, based on the obtained image (such as the visual intensity or the depth image). The background modeling may be static background modeling, and may also be dynamic background modeling constructed by using a Gaussian mixture model. And then, foreground pixels in the visual image and the depth image are extracted, respectively, using a background subtraction method. And then, a region where the first target is located is detected in a foreground image. In a case where the first target is a person, according to an example of the present invention, a human body region may be detected in a foreground image using a human body template.

In addition, according to another example of the present invention, in order to accurately detect whether the first target exists in the obtained image, when the obtained image is an image obtained by a stereo camera, the target detecting unit 610 may generate a depth image corresponding to the obtained image, and may project the foreground image into a three-dimensional coordinate system using the depth image to generate a three-dimensional foreground point cloud. And then, a bird's-eye view of the foreground is obtained by calculation based on the three-dimensional foreground point cloud. For example, by using the three-dimensional foreground point cloud, pixels in the foreground image may be transformed from a camera coordinate system where the camera for obtaining the image is located to a world coordinate system. And then, in the unified world coordinate system, a three-dimensional space is divided by vertical intervals (bins). And then, statistics of numbers or maximum values of foreground pixels included in the vertical intervals are taken, so that statistical analysis is performed for the bird's-eye view to determine the human body region.

When the first target exists in the image, the object recognizing unit 620 recognizes whether the first target holds an object. According to an example of the present invention, after the target detecting unit 610 obtains the region where the first target is located, the object recognizing unit 620 may establish a more accurate model using visual representation information such as a histogram of gradient (HoG) or scale-invariant feature transform (SIFT) to recognize the target who holds the object.

In addition, preferably, when the object recognizing unit 620 recognizes that the first target holds the object, the region where the detected first target is located may be further divided to position a region where the held object is located.

Specifically, an upper limb region of the first target may be determined using prior information of object structure and skin color; and then, search for an object region is performed around the upper limb region; and finally, morphological operation and smoothing is performed for the searched object region to perform complementation, so that the positioning for the region of the held object is completed.

If the held object is positioned, it may be determined that the scene corresponding to the obtained image is a scene with a target holding an object. And if the held object is not positioned, it may be determined that the scene corresponding to the obtained image is a scene without a target holding an object.

When the first target holds the object, the object information obtaining unit 630 obtains motion information of the object. According to an example of the present invention, the motion information of the object may include at least one of a movement speed of the object, a motion direction of the object, and a method for using the object by the first target. As another example, the method for using the object by the first target may be waving, cutting, throwing and the like. Additionally, the motion information such as the movement speed, the motion direction and the method for using the object may be calculated, according to object history motion information obtained based on the previously obtained images and object current motion information obtained based on the currently obtained image. And then, the abnormal situation determining unit 640 determines whether the abnormal situation exists, based on the motion information of the object.

For example, the object information obtaining unit 630 may establish a motion energy image (MEI) and a motion history image (MHI) of the object held by the target, based on the object history motion information and the object current motion information. Specifically, the MEI describes a motion shape and spatial distribution of motion of the object, and amplitude of each pixel in the MHI represents a function of motion intensity at the position of the pixel. One of the benefits of the MHI representing the motion of the object is that motion of a plurality of images within a time range is encoded and displayed in one frame of image. The MEI and the MHI may be regarded as two components of a time domain template of the object motion, and all of the components of pixel of the time domain template are a function of the motion of the position pixel. A motion mode of the object can be determined and the method for using the object by the first target can be further determined, by performing matching between the time domain templates of the motion relating to these visual angles and templates of known motion types.

Figure 7:
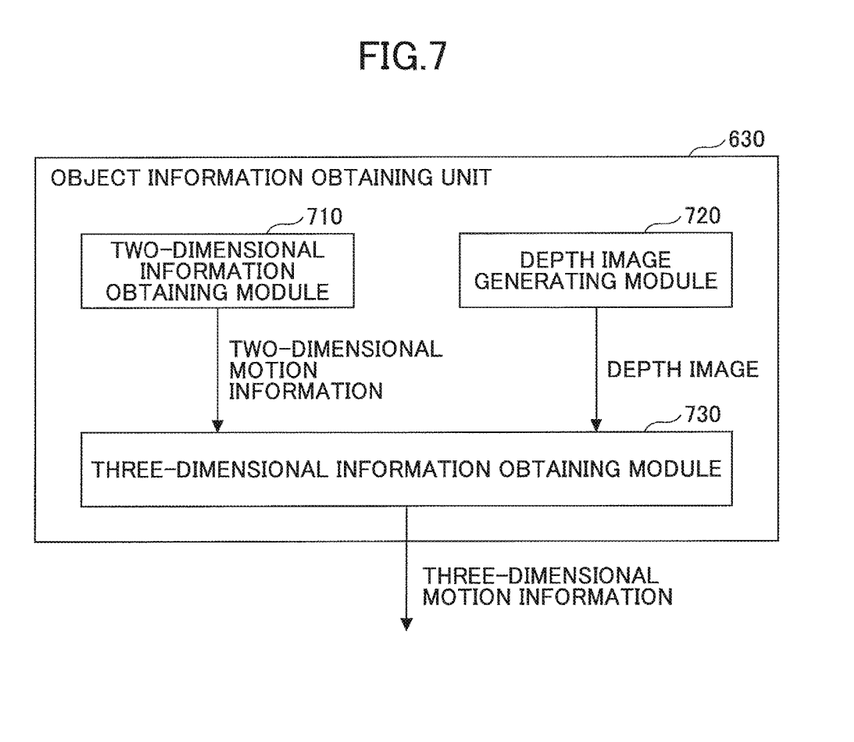
FIG. 7 is a structure block diagram illustrating an object information obtaining unit according to another embodiment of the present invention.

FIG. 7 is a structure block diagram illustrating the object information obtaining unit 630 according to another embodiment of the present invention. As shown in FIG. 7, the object information obtaining unit 630 may include a two-dimensional information obtaining module 710, a depth image generating module 720, and a three-dimensional information obtaining module 730. In order to reduce the influence of viewing angle and reliably determine the motion information of the object held by the target, preferably, the two-dimensional information obtaining module 710 may obtain two-dimensional motion information of the object held by the target, based on a sequence of images obtained in a period; the depth image generating module 720 may generate a depth image of the obtained image; and the three-dimensional information obtaining module 730 may project the two-dimensional motion information of the object into a three-dimensional space using the depth image to generate three-dimensional motion information of the object. Accordingly, the abnormal situation determining unit 640 may determine whether the abnormal situation exists, based on the three-dimensional motion information of the object.

For example, after the two-dimensional information obtaining module 710 obtains a two-dimensional MHI, the three-dimensional information obtaining module 730 may project the two-dimensional MHI into a three-dimensional space using the depth image of the obtained image to obtain a three-dimensional MHI. Representation of object motion and recognition of motion mode may be performed using the three-dimensional MHI. At the same time, a speed and a direction of movement of the object in the three-dimensional space may be accurately calculated based on the three-dimensional MHI.

Additionally, according to another example of the present invention, the abnormal situation detecting apparatus 600 may determine whether the abnormal situation exists in the scene based on the first target who holds the object in the obtained image, and correlation between the first target and another target. Specifically, the abnormal situation detecting apparatus 600 may further include a target information obtaining unit. The target information obtaining unit obtains motion information of the first target, when the first target holds the object; and the abnormal situation determining unit 640 determines whether the abnormal situation exists based on the motion information of the first target.

In order to accurately obtained motion information of the target in the obtained image and the object held by the target, according to an example of the present invention, a depth image of the obtained image may be generated; the first target and the object may be projected into a three-dimensional space using the depth image to obtain three-dimensional motion information of the first target and the object in the three-dimensional space; and the three-dimensional motion information of the first target and the object may be projected into a bird's-eye view to obtain bird's-eye motion information of the first target and the object. Accordingly, it may be determined whether the abnormal situation exists, based on the bird's-eye motion information of the object and the first target.

Furthermore, preferably, the abnormal situation detecting apparatus may further include a distance determining unit. The distance determining unit determines, in the obtained image, whether the first target moves toward a second target, based on the motion information of the first target; and the abnormal situation determining unit 640 determines whether the abnormal situation exists, based on a distance between the first target and the second target, when the first target moves toward the second target. The calculation of the risk of the behavior of the first target and the determination of the abnormal situation based on the direction and speed of the movement of the first target, the direction and speed of the movement of the held object, and the distance between the first target and the second target have been described with reference to the formula (2), thus the description is omitted here.

According to the apparatus for detecting the abnormal situation of embodiments of the present invention, it is recognized whether a target in an image holds an object, and it is determined whether the abnormal situation exists based on motion information of the held object when the target holds an object. Compared with the conventional method and apparatus for determining an abnormal situation by performing image recognition for an object, the method and the apparatus for detecting the abnormal situation according to the embodiments of the present invention can provide a more accurate and robust recognition result of the abnormal situation. Thus, the method and the apparatus for detecting the abnormal situation according to the embodiments of the present invention can be flexibly and effectively applied in an actual monitoring scene where a large number of variable objects with a risk may emerge.

According to another example of the present invention, the abnormal situation determining unit 640 of the abnormal situation detecting apparatus 600 may determine whether the abnormal situation exists, based on both the risk of the object held by the first target calculated by the formula (1) and the risk of the risk of the behavior of the first target calculated by the formula (2).

Furthermore, preferably, the abnormal situation detecting apparatus may further include a recognition unit. The recognition unit performs image recognition for the object held by the first target to determine attributes of the object; and the abnormal situation determining unit 640 determines whether the abnormal situation exists based on the determined attributes of the object.

Additionally, when it is recognized that the first target does not hold an object, the abnormal situation determining unit 640 of the abnormal situation detecting apparatus 600 may determine whether the abnormal situation exists, based on the motion information of the first target and a result of image recognition of the first target.

Figure 8:
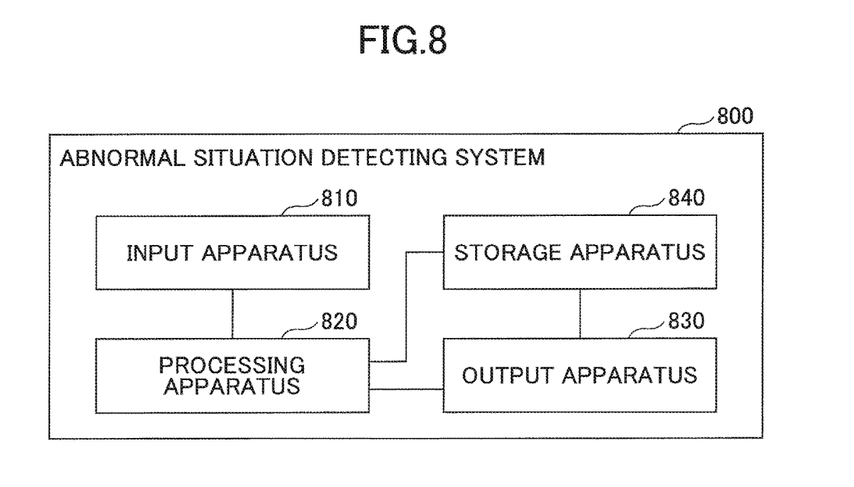
FIG. 8 is an overall hardware block diagram illustrating an abnormal situation detecting system according to another embodiment of the present invention.

According to another embodiment of the present invention, the present invention may also be implemented as a system for detecting an abnormal situation. FIG. 8 is an overall hardware block diagram illustrating an abnormal situation detecting system 800 according to an embodiment of the present invention. As illustrated in FIG. 8, the abnormal situation detecting system 800 may include: an input apparatus 810 for inputting video images photographed by a stereo camera from the outside, including image transmission cables, image input ports, etc.; a processing apparatus 820 for implementing the above method for detecting the abnormal situation according to the embodiments of the present invention, such as a CPU of a computer or other chips having processing ability, etc., which are connected to a network such as the Internet (not shown) to transmit the processed results to the remote apparatus based on the demand of the processing; an output apparatus 830 for outputting the result obtained by implementing the above process of detecting the abnormal situation to the outside, such as a screen, a communication network and a remote output device connected thereto, etc.; and a storage apparatus 840 for storing the obtained images, data including the motion information of the first target and the object by a volatile method or a nonvolatile method, such as various kinds of volatile or nonvolatile memory including a random-access memory (RAM), a read-only memory (ROM), a hard disk and a semiconductor memory.

As known by a person skilled in the art, the present invention may be implemented as a system, an apparatus, a method or a computer program product. Therefore, the present invention may be specifically implemented as hardware, software (including firmware, resident software, micro-code, etc.) a combination of hardware and software, which is referred to as a "circuit", "module", "apparatus" or "system". Additionally, the present invention may also be implemented as a computer program product in one or more computer-readable media, and the computer-readable media includes computer-readable computer codes.

Any combinations of one or more computer-readable media may be used. The computer-readable medium may be a computer-readable signal medium or a computer-readable storage medium. The computer-readable storage medium may be, for example, a system, apparatus or an element of electric, magnetic, optic, electromagnetic, infrared or semiconductor, or a combination of any of the above, but is not limited to them. Specifically, the computer-readable storage medium may include a single electrical connection having a plurality of wires, a portable computer disk, a hard disk, a random access memory (RAM), a read-only memory (ROM), an erasable programmable read-only memory (an EPROM or a Flash memory), an optical fiber, a portable compact disc read-only memory (CD-ROM), an optical memory device, a magnetic storage device, or a suitable combination of any of the above. In the present specification, the computer-readable storage medium may include tangible medium including or storing a program, and the program may be used by an instruction execution system, apparatus, device or a combination thereof.

The computer-readable signal medium may include data signals to be propagated as a part of a carrier wave, where computer-readable program codes are loaded. The propagated data signals may be electromagnetic signals, optical signals or a suitable combination thereof, but is not limited to these signals. The computer-readable medium may also be any computer-readable medium except the computer-readable storage medium, the computer-readable medium may send, propagate or transmit a program used by an instruction execution system, apparatus, device or a combination thereof.

The program codes included in the computer-readable medium may be transmitted by any media, such as wireless, wire, optical cable, RF or any combinations thereof.

The computer program codes for executing the operation of the present invention may be edited by one or more programming languages or a combination thereof. The programming languages include an object-oriented language such as JAVA, Smalltalk, C++, and a procedural programming language such as C or similar programming languages. The program codes may be executed on a user's computer completely or partly, be executed as an independent software package, be executed on a user's computer partly and a remote computer partly, or be executed on a remote computer or server completely. The remote computer may be connected to the user's computer via any networks such as a local area network (LAN) or a wide area network (WAN), or may be connected to an external computer (for example by an internet provided by an internet service provider).

The present invention is described with reference to the flowcharts and/or block diagrams of the method, apparatus (system) and computer program products according to the embodiments of the present invention. It should be noted that, each block and a combination of the blocks in the flowcharts and/or the block diagrams may be implemented by computer program instructions. The computer program instructions may be provided to a processor of a general-purpose computer, a special purpose computer or other programmable data processing apparatus, and the computer program instructions are executed by the computer or other programmable data processing apparatus to implement functions/operations in the flowcharts and/or the block diagrams.

The computer program instructions may also be stored in the computer-readable medium for making the computer or other programmable data processing apparatus operate in a specific manner, and the instructions stored in the computer-readable medium may generate manufactures of an instruction means for implementing the functions/operations in the flowcharts and/or the block diagrams.

The computer program codes may also be loaded on the computer, other programmable data processing apparatus or other device, so as to execute a series of operation steps in the computer, other programmable data processing apparatus or other device, so that the instructions executed in the computer or other programmable apparatus can provide a process for implementing the functions/operations in the flowcharts and/or block diagrams.

The available system structure, functions and operations of the system, method and computer program product according to the present invention are illustrated by the flowcharts and block diagrams in the drawings. Each of the blocks in the flowcharts or block diagrams represent a module, program segment or a part of codes, and the module, program segment or the part of codes include one or more executable instructions for implementing logic functions. It should be noted that, in the apparatus or method of the present invention, units or steps may be divided and/or recombined. The division and/or recombination should be regarded as an equivalent embodiment of the present invention. Steps of the above method may be performed in a time order, however the performed sequence is not limited to the time order. Any steps may be performed in parallel or independently.

The present invention is not limited to the specifically disclosed embodiments, and various modifications, combinations and replacements may be made without departing from the scope of the present invention.

The present application is based on and claims the benefit of priority of Chinese Priority Application No. 201510102360.7 filed on Mar. 9, 2015, the entire contents of which are hereby incorporated by reference.

What is claimed is:

1. A method for detecting an abnormal situation, the method comprising:
   detecting whether a first target exists in an obtained image;
   recognizing whether the first target holds an object, when the first target exists in the image;
   obtaining motion information of the object, when the first target holds the object;
   determining, based on the motion information of the object, whether the abnormal situation exists;
   obtaining motion information of the first target, when the first target holds the object; and
   determining, based on the motion information of the first target, whether the abnormal situation exists, wherein obtaining the motion information of the object and the motion information of the first target includes
   generating a depth image of the obtained image,
   projecting the first target and the object into a three-dimensional space using the depth image to obtain three-dimensional motion information of the first target and the object in the three-dimensional space, and
   projecting the three-dimensional motion information of the first target and the object into a bird's-eye view to obtain bird's-eye motion information of the first target and the object, wherein determining whether the abnormal situation exists based on the motion information of the object includes
   determining, based on the bird's-eye motion information of the object, whether the abnormal situation exists, and
   wherein determining whether the abnormal situation exists based on the motion information of the first target includes
   determining, based on the bird's-eye motion information of the first target, whether the abnormal situation exists.

2. The method for detecting an abnormal situation according to claim 1,
   wherein the motion information of the object includes at least one of a motion speed of the object, a motion direction of the object, and a method for using the object by the first target.

3. The method for detecting an abnormal situation according to claim 1,
   wherein obtaining the motion information of the object includes
   obtaining two-dimensional motion information of the object,
   generating a depth image of the obtained image, and
   projecting the two-dimensional motion information of the object into a three-dimensional space using the depth image to generate three-dimensional motion information of the object, and
   wherein determining whether the abnormal situation exists based on the motion information of the object includes
   determining, based on the three-dimensional motion information of the object, whether the abnormal situation exists.

4. The method for detecting an abnormal situation according to claim 1, the method further comprising:
   determining, in the obtained image, based on the motion information of the first target, whether the first target moves toward a second target; and
   determining, based on a distance between the first target and the second target, whether the abnormal situation exists, when the first target moves toward the second target.

5. An apparatus for detecting an abnormal situation, the apparatus comprising:
   a camera configured to detect whether a first target exists in an obtained image;
   a memory storing computer-readable instructions; and
   one or more processors configured to execute the computer-readable instructions such that the one or more processors are configured to perform operations including,
   recognizing whether the first target holds an object, when the first target exists in the image;
   obtaining motion information of the object, when the first target holds the object;
   determining, based on the motion information of the object, whether the abnormal situation exists;
   obtaining motion information of the first target, when the first target holds the object; and
   determining, based on the motion information of the first target, whether the abnormal situation exists, wherein obtaining the motion information of the object and the motion information of the first target includes
   generating a depth image of the obtained image,
   projecting the first target and the object into a three-dimensional space using the depth image to obtain three-dimensional motion information of the first target and the object in the three-dimensional space, and projecting the three-dimensional motion information of the first target and the object into a bird's-eye view to obtain bird's-eye motion information of the first target and the object, wherein determining whether the abnormal situation exists based on the motion information of the object includes determining, based on the bird's-eye motion information of the object, whether the abnormal situation exists, and wherein determining whether the abnormal situation exists based on the motion information of the first target includes determining, based on the bird's-eye motion information of the first target, whether the abnormal situation exists.

6. The apparatus for detecting an abnormal situation according to claim 5, wherein the one or more processors are configured to
obtain two-dimensional motion information of the object,
generate a depth image of the obtained image, and
project the two-dimensional motion information of the object into a three-dimensional space using the depth image to generate three-dimensional motion information of the object, and wherein the one or more processors determine, based on the three-dimensional motion information of the object, whether the abnormal situation exists.

7. The apparatus for detecting an abnormal situation according to claim 5, wherein the one or more processors are further configured to obtain motion information of the first target, when the first target holds the object, and
determine, based on the motion information of the first target, whether the abnormal situation exists.

8. The apparatus for detecting an abnormal situation according to claim 7, wherein the one or more processors are further configured to determine, in the obtained image, based on the motion information of the first target, whether the first target moves toward a second target, and determine, based on a distance between the first target and the second target, whether the abnormal situation exists, when the first target moves toward the second target.

9. A non-transitory computer-readable recording medium having stored therein a program for causing a computer to execute a process for detecting an abnormal situation, the process comprising:

detecting whether a first target exists in an obtained image;
recognizing whether the first target holds an object, when the first target exists in the image;
obtaining motion information of the object, when the first target holds the object;
determining, based on the motion information of the object, whether the abnormal situation exists;
obtaining motion information of the first target, when the first target holds the object; and
determining, based on the motion information of the first target, whether the abnormal situation exists, wherein obtaining the motion information of the object and the motion information of the first target includes
generating a depth image of the obtained image,
projecting the first target and the object into a three-dimensional space using the depth image to obtain three-dimensional motion information of the first target and the object in the three-dimensional space, and
projecting the three-dimensional motion information of the first target and the object into a bird's-eye view to obtain bird's-eve motion information of the first target and the object, wherein determining whether the abnormal situation exists based on the motion information of the object includes
determining, based on the bird's-eye motion information of the object, whether the abnormal situation exists, and
wherein determining whether the abnormal situation exists based on the motion information of the first target includes
determining, based on the bird's-eve motion information of the first target, whether the abnormal situation exists.

10. The method for detecting an abnormal situation according to claim 1, wherein the first target is a person and the object is an implement held by the person.

* * * * *